United States Patent
Venditti et al.

(10) Patent No.: US 8,533,147 B2
(45) Date of Patent: Sep. 10, 2013

(54) METHOD AND SYSTEM FOR CREATING A DYNAMIC SYSTEMS BASED HYBRID MODEL FOR REASONING SYSTEMS

(75) Inventors: Paul Venditti, Clifton Park, NY (US); Thomas Paul Repoff, Sprakers, NY (US); Michael Craig Clark, Glen Ellyn, IL (US)

(73) Assignee: General Electric Company, Niskayuna, NY (US)

( * ) Notice: Subject to any disclaimer, the term of this patent is extended or adjusted under 35 U.S.C. 154(b) by 334 days.

(21) Appl. No.: 12/971,332

(22) Filed: Dec. 17, 2010

(65) Prior Publication Data

US 2012/0158640 A1    Jun. 21, 2012

(51) Int. Cl.
G06F 17/00    (2006.01)
G06N 7/00    (2006.01)

(52) U.S. Cl.
USPC ............................................................ 706/59

(58) Field of Classification Search
USPC .......................................................... 706/59
See application file for complete search history.

(56) References Cited

U.S. PATENT DOCUMENTS

| | | | |
|---|---|---|---|
| 6,311,166 B1 | 10/2001 | Nado et al. | |
| 6,834,256 B2* | 12/2004 | House et al. | 702/181 |
| 7,541,577 B2* | 6/2009 | Davenport et al. | 250/288 |
| 7,542,932 B2* | 6/2009 | Chalermkraivuth et al. | 705/35 |
| 7,640,201 B2* | 12/2009 | Chalermkraivuth et al. | 705/36 R |
| 8,099,376 B2* | 1/2012 | Serrano-Morales et al. | 706/47 |
| 2002/0165841 A1 | 11/2002 | Quaile | |
| 2004/0078319 A1 | 4/2004 | Madhavan et al. | |
| 2004/0215551 A1 | 10/2004 | Eder | |
| 2005/0080701 A1 | 4/2005 | Tunney et al. | |

* cited by examiner

*Primary Examiner* — Michael B Holmes
(74) *Attorney, Agent, or Firm* — Scott J. Asmus

(57) ABSTRACT

A method for creating a dynamic systems based hybrid model for reasoning systems is described. The method receives, at a server, a plurality of expert identified deal attributes. The method presents a conjoint analysis questionnaire for input by one or more respondents. The conjoint analysis questionnaire includes questions based on the plurality of expert identified deal attributes. The method receives responses of the one or more respondents to the conjoint analysis questionnaire. The method then defines an expert reasoning model based on the responses of the one or more respondents to the conjoint analysis questionnaire. The method accesses historical deal information of one or more deals, the historical deal information including one or more deals, each deal including a plurality of expert identified deal attributes and a part-worth associated with each of the deal attributes. Finally, the method validates the expert reasoning model based on the historical deal information.

15 Claims, 4 Drawing Sheets

METHOD AND SYSTEM FOR CREATING A DYNAMIC SYSTEMS BASED HYBRID MODEL FOR REASONING SYSTEMS

FIELD OF INVENTION

The present disclosure relates to the field of automated reasoning systems, and more particularly to, a method, system, and computer program product for creating dynamic systems based hybrid models in the context of a customer configured reasoning system.

BACKGROUND

Enterprise decision management (EDM) is an emerging technology driven by the need of businesses to automate mission-critical decisions, and to introduce precision and consistency in the decision making process. EDM employs rule based systems and analytic models for automated decision making. Businesses are adopting EDM systems to deal with increasing business decision complexity. EDM systems offer a competitive advantage to businesses operating in areas where the window of competitive advantage is short, while requirements for precision and consistency are high.

Typically, EDM systems uses historical behavioral data, prior decisions, and their outcomes to build the rule based systems and/or analytic models.

However, businesses often lack comprehensive or substantial historical data to develop accurate empirical models for critical business risk/value based decisions. Subjective data may contribute substantially to model predictive power. For most businesses, the cost, and difficulty in capturing subjective data of sufficient quality, may be too difficult. These shortcomings stem from the inherent difficulty in defining the subjective data attributes, and effectively integrating the subjective data attributes in the decision making model. Temporal stability of these data attributes also impacts model relevance and usefulness over time.

Some known EDM systems include business-specific or industry-specific packages, to reduce the amount of subjective data required for automated decision making. Although such systems may provide more accurate objective data attributes, the shortcomings related to capturing high quality data pertaining to the subjective data attributes may still remain.

Further, most known EDM systems use historical data to build the rule based systems and analytic models. Therefore, such systems may lack the ability to adapt "on-the-fly" with changing business strategies and external economic factors. In other words, known EDM systems may lack the intelligence to factor the reasoning process of human experts into the decision making models.

Therefore, what is needed is a method for creating and sustaining a model for automated decision making that is more accurate and consistent than known solutions.

BRIEF DESCRIPTION

A method for creating a dynamic systems based hybrid model for reasoning systems is described. The method receives, at a server, a plurality of expert identified deal attributes. The method presents a conjoint analysis questionnaire for input by one or more respondents. The conjoint analysis questionnaire includes questions based on the plurality of expert identified deal attributes. The method receives responses of the one or more respondents to the conjoint analysis questionnaire. The method then defines an expert reasoning model based on the responses of the one or more respondents to the conjoint analysis questionnaire. The method accesses historical deal information of one or more deals, the historical deal information including one or more deals, each deal including a plurality of expert identified deal attributes and a part-worth associated with each of the deal attributes. Finally, the method validates the expert reasoning model based on the historical deal information.

DETAILED DESCRIPTION OF THE EMBODIMENTS

Embodiments presented herein provide methods, systems and computer program products for creating a dynamic systems based hybrid model for reasoning systems.

Figure 1:
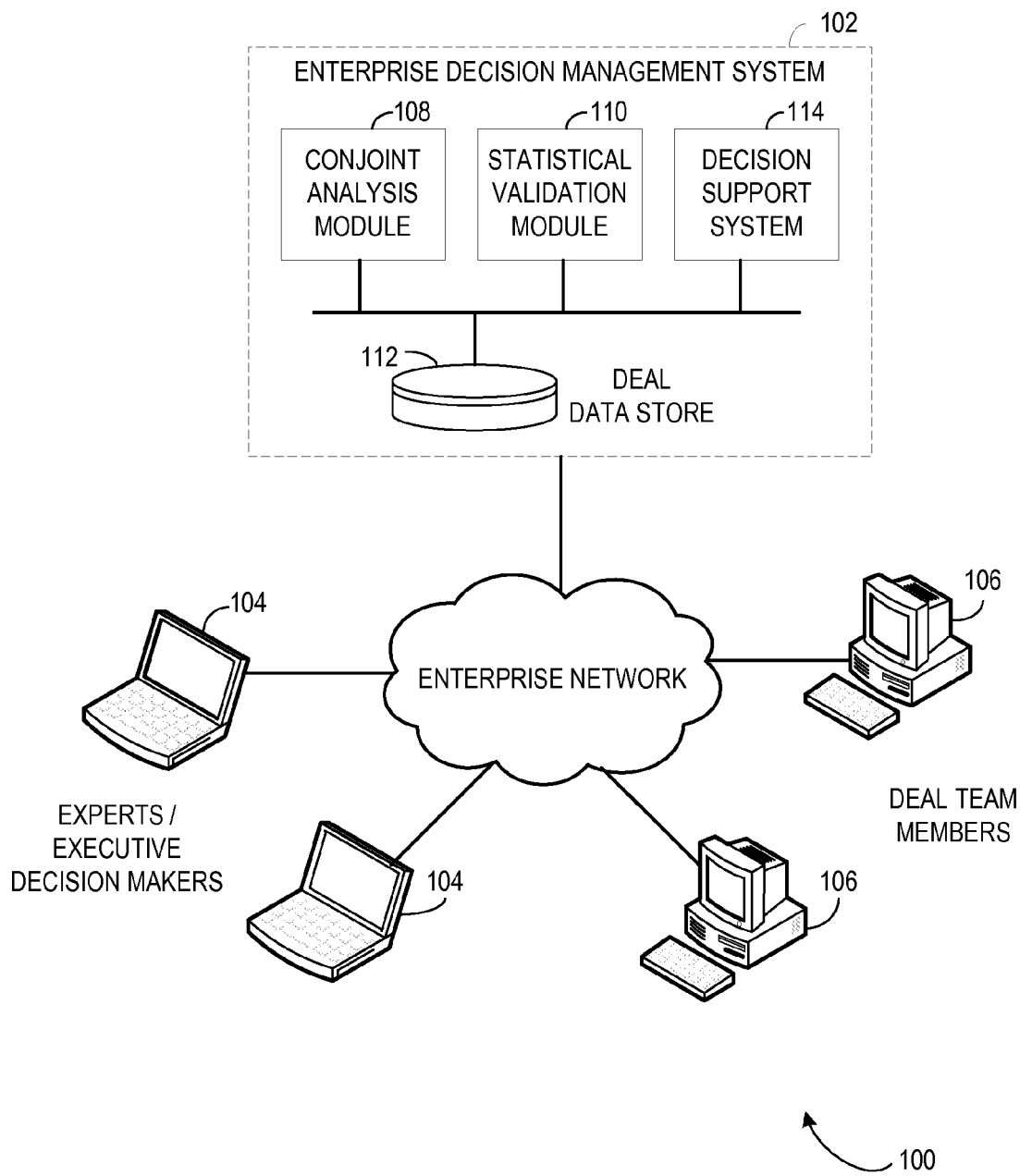
FIG. 1 illustrates an environment, in which embodiments of a decision making model generator may operate, according to one embodiment.

FIG. 1 illustrates an example enterprise environment 100 in which various embodiments may operate. Enterprise environment 100 includes a enterprise decision management (EDM) system 102, one or more expert client nodes 104, and one or more deal team client nodes 106. The EDM system 102, the expert client nodes 104, and the deal team client nodes 106 may communicate through an enterprise network. The enterprise network may be implemented as a wired network such as Ethernet, a wireless network such as IEEE 802.11, or a combination of the two. The enterprise network may also include a virtual private network (VPN) for connecting the expert client nodes 104, and the deal team client nodes 106 with the EDM system 102 over the internet.

The EDM system 102 may also include one or more decision support systems to automate decision making across the enterprise. The decision support systems automate high-volume decisions, and integrate accuracy, consistency, and speed into the decision making steps. A typical decision making process includes identifying relevant attributes, identifying the value of each of the relevant attributes, and integrating the attributes into an overall evaluation.

Embodiments presented herein describe methods and systems to create a hybrid decision making model for such decision support systems. The EDM system 102 receives inputs from experts and executive decision makers that identify the relevant attributes, and the value of each of the relevant attributes. The EDM system 102 then creates a decision making model based on the relevant attributes and values of each of the relevant attributes provided by the experts and executive decision makers. Prior research on the psychology of decision making suggests that experts are particularly well suited for identifying the relevant attributes, and identifying the value of each of the relevant attributes, while integrating the attributes into an overall evaluation is usually performed well by an automated system.

The EDM system 102 receives the expert identified deal attributes, from the expert client nodes 104. In one embodiment, the expert client nodes 104 may be owned by a model development team. The model development team may conduct individual qualitative interviews, focus group sessions, or both, with the experts and executive decision makers to identify the relevant deal attributes. Alternatively, the expert client nodes 104 may be owned by the experts and executive decision makers.

To ensure understanding of the relevant deal attributes in context of deal decision making, the model development team may also observe a number of deal approval discussions between the executive decision makers and the deal originators and underwriters. The model development team may observe the deal approval discussions over a length of time, for example four months.

The model development team may also conduct a data consistency exercise to ensure consistent understanding of the deal attributes as applied to real deals. In one example data consistency exercise, all deal information documents may be placed in a repository, such as a deal data store. The deal decision and rating is conducted based on the deal information documents. Such a process helps ensure that the deal team members and the executive decision makers refer to the same information for making deal decisions and rating the deals attributes.

The EDM system 102 may then present a deal rating questionnaire to each of the deal team members and one or more marketing team members, prior to a deal discussion. The EDM system 102 prompts each of the deal team members and the marketing team members to populate the deal rating questionnaire independently. The EDM system 102 stores the ratings provided by the deal team members and the marketing team members.

A deal discussion is then conducted to discuss the ratings stored in the EDM system 102. The deal team, the marketing team, and the model development team participate in the deal discussion. Participants of the deal discussion then verify the ratings provided by each of the deal team members and the marketing team members, and identify a gold standard for deal attributes. The gold standard is essentially a set of correct ratings for the expert identified deal attributes, identified as a consensus between the participants of the deal discussion.

The model development team then identifies discrepancies in the ratings provided by the deal team and the marketing team, and the gold standard identified. The model development team tracks such discrepancies and updates the EDM system 102 to more accurately replicate the decision making process. The model development team may track the discrepancies between the deal team and the marketing team. The model development team may also track the discrepancies between the marketing and deal teams taken together, and the gold standard. The model development team may also tag each of the discrepancies as originating from lack of information, nature of the deal decision process, defects in definition of the expert identified deal attributes, miscellaneous sources, and so forth. The model development team may then update the EDM system 102 to address the discrepancies and the sources of the discrepancies. For instance, the model development team may refine the definitions for subjective attributes, as agreed upon by the deal team, the marketing team, and the executive decision makers. The data consistency exercise may also help account for special situations encountered in the real deals, that cause some of the deal attributes to be rated different from the usual ratings for other deals. Six sigma tools may be used to streamline tracking and tagging of the discrepancies. A six sigma methodology may ensure higher precision and accuracy.

The data consistency exercise may be conducted periodically to iteratively improve selection of expert identified deal attributes and maintain consistency among the various experts and executive decision makers.

The model development team may then send the expert identified deal attributes to the EDM system 102.

The EDM system 102 then transfers the expert identified deal attributes to a conjoint analysis module 108. In various embodiments, the conjoint analysis module 108 performs a hybrid conjoint analysis, including compositional (self-explicated) and decompositional (adaptive conjoint) tasks. The hybrid conjoint analysis combines the advantages of the self-explicated approaches and traditional adaptive conjoint analysis. The conjoint analysis module 108 designs a conjoint analysis questionnaire based on the expert identified deal attributes. The EDM system 102 communicates with the deal team client nodes 106, to present the conjoint analysis questionnaire to the deal team members. The deal team members may then submit their responses to the conjoint analysis questionnaire to the EDM system 102 through the deal team client nodes 106. An example process of designing and presenting the conjoint analysis questionnaire is described further in conjunction with FIG. 2.

The EDM system 102 receives the responses of the deal team members from the deal team client nodes 106, and transfers the responses to a conjoint analysis module 108. The conjoint analysis module 108 computes the part-worths of the deal attributes based on the responses of the deal team members. The conjoint analysis module 108 may then create an expert reasoning model based on the part-worths and expert identified deal attributes.

A statistical validation module 110 may then validate the expert reasoning model using historical deal information. The statistical validation module 110 may use statistical methods in the exploratory mode to create a data driven model from the historical deal information. The statistical validation module 110 may use techniques such as structural equation modeling in exploratory mode, classification and regression trees, and so forth. The statistical validation module 110 may then use the data driven model to validate the expert reasoning model. The conjoint analysis module 108 may re-tune the expert reasoning module, if required, based on the results of validation. The statistical validation module 110 may access the historical deal data from a deal data store 112. The statistical validation module 110 may also detect the temporal stability of preferences of the deal team members. Temporal stability of preferences for deal attributes can mean that decision makers exhibit the same preferences over time, or that their preferences are a stable function of states of nature and opportunities that change over time, such as competition and the economy. In one embodiment, the statistical validation module 110 may use an apriori sign violation of the estimated part-worths as a measure of the temporal stability. In other embodiments, the statistical validation module 110 may use other known techniques such as, but not limited to, dynamic Bayesian linear methods, regression tree methods; validity correlation methods, Rasch models, association rule mining methods, and so forth.

The deal data store 112 is a database including information pertaining to prior deals evaluated by the enterprise. The deal data store 112 may include the deal attributes associated with the prior deal, the values of the deal attributes, and the outcome of the deal evaluation such as, approved, disapproved, conditional approval, and so forth. The deal data store 112 may also include information pertaining to events post deal approval, such as, defaulted, complete repayment on time, repayment overdue, and so forth. The deal data store 112 may store the historical deal information in one of a database, a text file, a comma separated file, a tab separated file, a Java Script Object Notation file, and the like. In the database implementation of the deal data store 112, any known database solution such as a Relational Database Management System (RDBMS), an Extensible Markup Language (XML) database, a flat file database, and the like, may be used.

The expert reasoning model may then be built into a decision support system 114. The decision support system 114 may then accept the values of deal attributes as inputs, and predict the likelihood of approval of the deal by the experts and executive decision makers.

Figure 2:
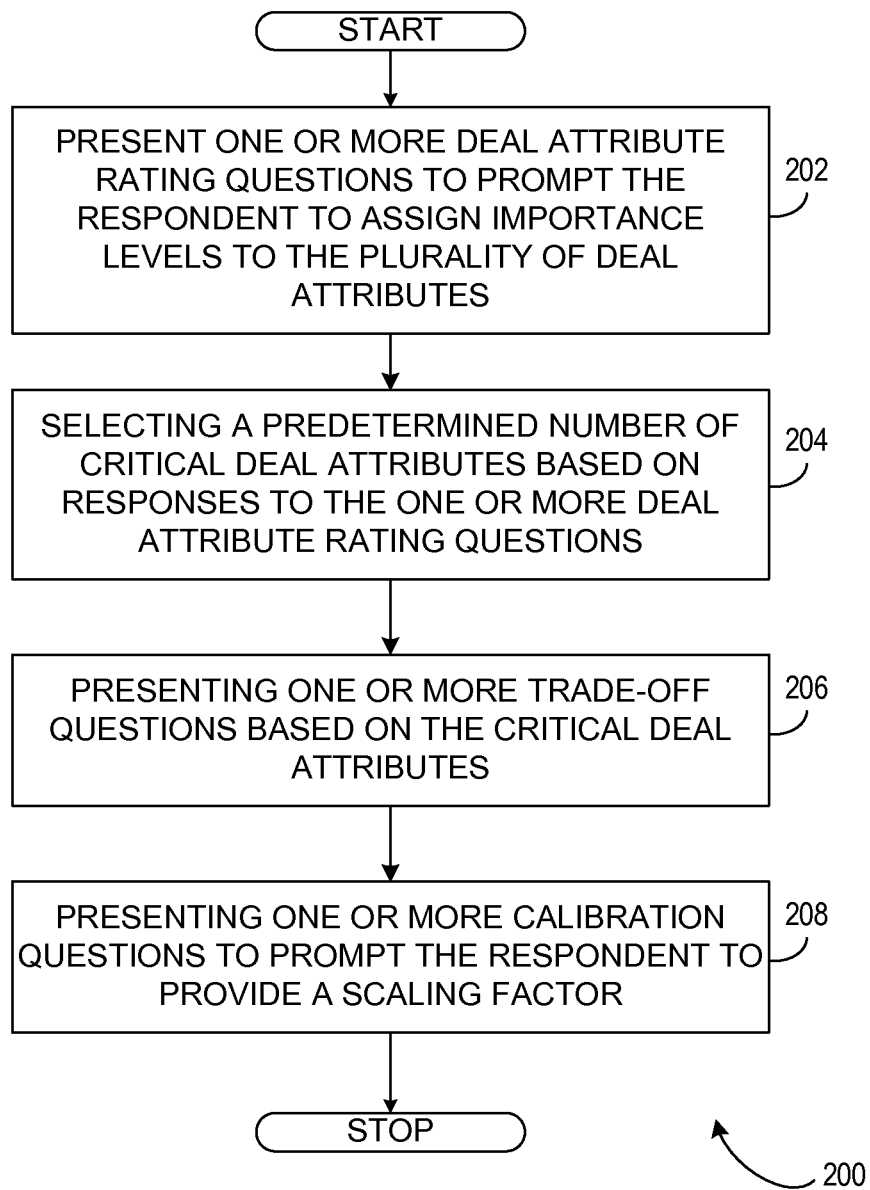
FIG. 2 is a flowchart illustrating a method for interviewing respondents with a conjoint analysis questionnaire, according to one embodiment.

FIG. 2 is a flowchart illustrating an example process of presenting a conjoint analysis questionnaire to the deal team, according to one embodiment.

At step 202, the conjoint analysis module 108 presents one or more deal attribute rating questions to prompt the deal team members to assign importance levels to the plurality of expert identified deal attributes. In one exemplary implementation, the deal attribute rating question is a constant sum question. The deal team members are prompted to assign importance levels to each of the expert identified deal attributes, such that the sum of the importance levels is a constant. For instance, the importance levels may indicate percentage importance, and the sum of the importance levels is 100. The deal attribute rating questions may be a free format question for assigning importance levels to each of the expert identified deal attributes.

The use of a free format question as a deal attribute rating question addresses some of the disadvantages related to traditional adaptive conjoint analysis questionnaires. Traditional adaptive conjoint analysis questionnaires present deal attribute rating questions to the deal team members in a sequential manner, with importance levels (for example 9 levels) ranging from "Completely Unimportant" to "Extremely Important". With traditional adaptive conjoint analysis questionnaires the deal team members may often say that all deal attributes are important (scale use bias), thus flattening the final derived importance levels and reducing predictive validity. Further, the deal team members may not use the importance scale in a "ratio" sense, even though the conjoint analysis module 108 may assume (for example) that a "6" on the scale is twice as important as a "3". Still further, the deal team members may assign a higher importance level to a deal attribute they see early on before realizing that another more important attribute is still to come. The constant sum free format question ensures that the deal team members are aware of all the deal attributes to be rated in a single question.

In one exemplary embodiment, the EDM system 102 may also receive one or more prohibition rules. The prohibition rules prohibit the selection of certain importance levels of a first deal attribute along with a certain importance level of a second deal attribute. For instance, a "Coverage" deal attribute may be dependent on an "Underwriting basis" deal attribute. A prohibition rule may force the levels selectable for "Coverage" to be driven by "Underwriting basis". If "underwriting basis" for a deal is cash flow from operations, then the levels for "coverage" may be indicated in terms of varying degrees of cash flow from operations.

At step 204, the conjoint analysis module 108 selects a predetermined number of critical deal attributes from the plurality of expert identified deal attributes, based on the responses of the deal team member to the deal attribute rating questions. The conjoint analysis module 108 may select the predetermined number of expert identified deal attributes with the highest importance levels as the critical deal attributes. The selection of a subset of the expert identified deal attributes allows for refinement of trade-off questions in the conjoint questionnaire. By including only the selected critical deal attributes for the trade-off questions, the conjoint analysis module 108 can better discriminate the deal attributes that are most important to the deal team member, while keeping the conjoint questionnaire reasonably short, and less tiring for the deal team member.

At step 206, the conjoint analysis module 108 presents one or more trade-off questions based on the selected critical deal attributes. The trade-off questions include a pair of complete deal profiles, differing in, for example 3 critical deal attributes, and having the other critical deal attributes as identical. The conjoint analysis module 108 then prompts the deal team members to specify which deal profile is more likely to be approved.

At step 208 the conjoint analysis module 108 presents one or more calibration questions to prompt the deal team member to provide a scaling factor. The calibration questions present a complete deal profile to the deal team member, and prompt the deal team member to indicate an approval score ranging, for example, from 0 to 100, 0 indicating definite disapproval, and 100 indicating definite approval. The conjoint analysis module 108 uses the responses to the calibration questions to validate the responses of the deal team member to the attribute rating questions and the trade-off questions. The conjoint analysis module 108 also uses the responses to the calibration questions to scale the part-worths of the critical deal attributes. For example, the conjoint analysis module 108 may present 4 calibration questions, a definite approval deal profile with an approval score of 100, a definite disapproval deal profile with an approval score of 0, and two intermediate deal profiles having an approval score between 25 and 75. The conjoint analysis module 108 may then take ratios of expected approval scores and the responses of the deal team member to compute a scaling factor. The conjoint analysis module 108 may then use the scaling factor to scale the part-worths of the critical deal attributes of the deal team member.

The conjoint analysis module 108 may then use the response of the deal team members to the conjoint analysis questionnaire to define an expert reasoning model. An exemplary process for defining the expert reasoning model is described in conjunction with FIG. 3.

Figure 3:
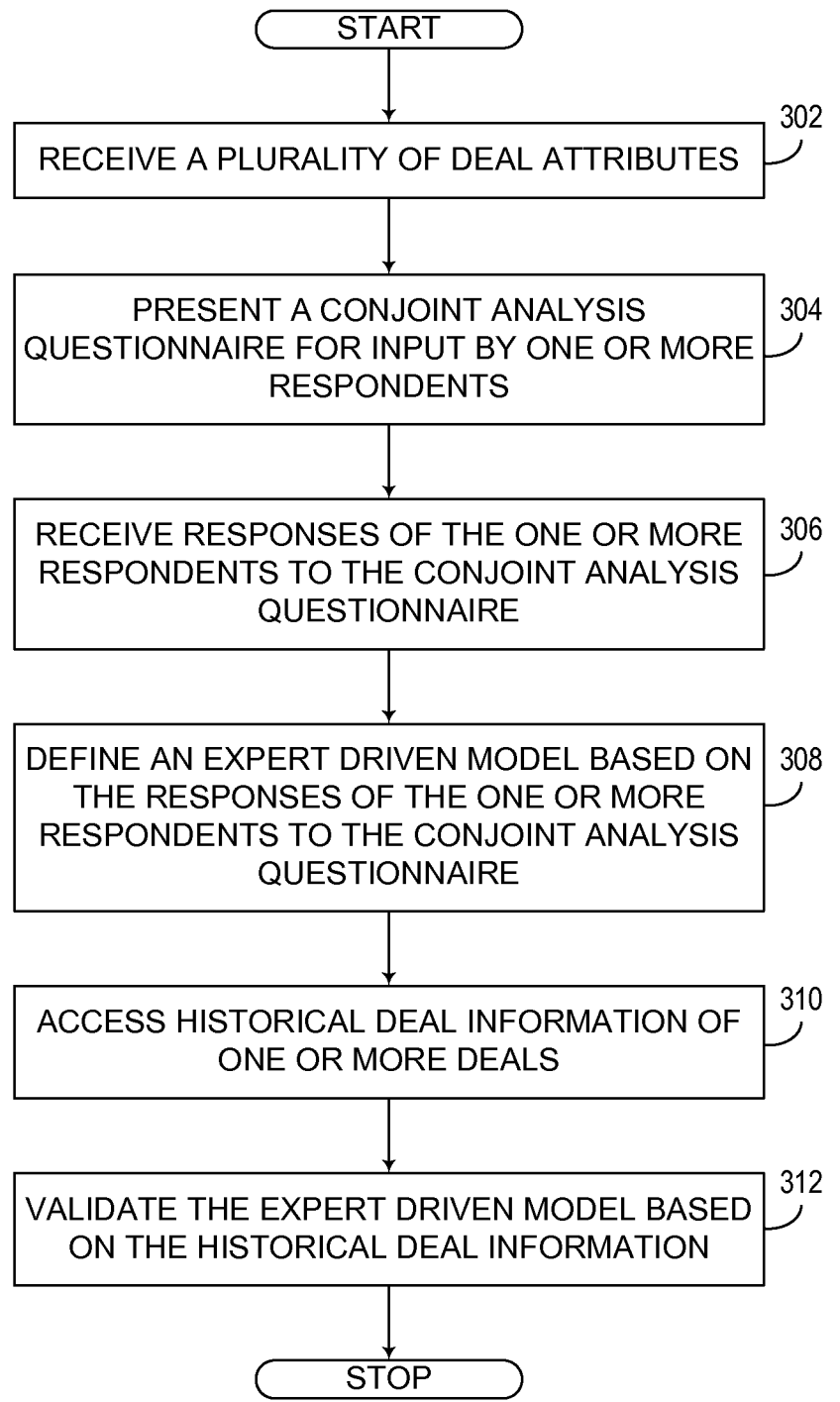
FIG. 3 is a flowchart illustrating a method for creating a dynamic systems based hybrid model for automated decision making, according to one embodiment.

FIG. 3 is a flowchart illustrating an exemplary a method for creating a dynamic systems based hybrid model for automated decision making, according to one embodiment.

At step 302, the EDM system 102 receives a plurality of expert identified deal attributes. The EDM system 102 may receive the expert identified deal attributes from the expert client nodes 104. An exemplary method for identifying deal attributes based on the knowledge and intuition of the experts and the executive decision makers is described in conjunction with FIG. 1.

At step 304, the conjoint analysis module 108 presents a conjoint analysis questionnaire for input by the deal team members. The conjoint analysis questionnaire includes questions based on the plurality of expert identified deal attributes. The conjoint analysis questionnaire includes questions such as deal attribute rating questions, trade-off questions, and calibration questions. The conjoint analysis module 108 employs a modified adaptive conjoint analysis methodology that presents questions based on the responses to the preceding questions. An exemplary method for presenting the conjoint analysis questionnaire is described in conjunction with FIG. 2.

At step 304, the conjoint analysis module 108 receives the responses of the deal team members to the conjoint analysis questionnaire. In one implementation, the conjoint analysis module 108 employs a modified adaptive conjoint analysis methodology as described in FIG. 2. In such an implementation, the conjoint analysis module 108 adapts the questions presented in the conjoint analysis questionnaire, based on the responses of the deal team members to the preceding questions in the conjoint analysis questionnaire. The conjoint analysis module 108 may receive the responses from the deal team members as soon as the deal team member submits a response to a particular question of the conjoint analysis questionnaire.

At step 306, the conjoint analysis module 108 defines an expert reasoning model based on the responses of the deal team members to the conjoint analysis questionnaire.

In one exemplary embodiment, the conjoint analysis module 108 uses ordinary least squares regression to estimate the part-worth of each of the critical deal attributes. Alternatively, the conjoint analysis module 108 may use other techniques such as Hierarchical Bayesian methodology to estimate the part-worth of each of the critical deal attributes. The conjoint analysis module 108 may estimate the part-worth for each of the critical deal attributes for each deal team member individually. Alternatively, the conjoint analysis module 108 may estimate the part-worth for each of the critical deal attributes for groups of deal team members. The groups may be formed based on, for example, the type of deals, the industry in which the deal team member assesses the deals, and so forth. In some implementations, the conjoint analysis module 108 may estimate the part-worth for each of the critical deal attributes for the complete deal team across the enterprise.

Based on the estimated part-worth for each of the critical deal attributes, the conjoint analysis module 108 may then create the expert reasoning model based on the part-worths of each of the critical deal attributes. In one embodiment, the conjoint analysis module 108 may compute a utility function for each of the deal team members. The conjoint analysis module 108 may then create an expert reasoning model based on the utility functions of each of the deal team members. For instance, the expert reasoning model may be a linear model to compute a total utility expressed as a sum of the individual part-worths, such as:

$$\text{Total Utility} = PW1 + PW2 + PW3 + \ldots + PWn + k \quad \text{(Equation 1)}$$

where PWn is the estimated part-worth for critical deal attribute "n", and k is the model intercept constant.

In one exemplary embodiment, the conjoint analysis module 108 may perform principal component analysis (PCA) to identify a minimal set of uncorrelated principal deal factors. The conjoint analysis module 108 may take into account the estimated part-worths of the critical deal attributes to transform the critical deal attributes into a smaller number of principal deal factors. The principal deal factors may then be used to define the expert reasoning model.

At step 308, the statistical validation module 110 accesses historical deal information of one or more deals. The statistical validation module 110 may access the historical deal information from the deal data store 112. As described earlier, the deal data store 112 may include one or more deals, each deal having part-worths associated with each of the various deal attributes.

At step 310, the statistical validation module 110 validates the expert reasoning model based on the historical deal information. The statistical validation module 110 may predict a likelihood of approval score based on the historical deal data and the expert reasoning model. In an exemplary implementation, the statistical validation module 110 may perform exploratory statistical methods such as structural equation modeling in the exploratory mode, and classification and regression trees, on historical deal data, to validate the expert reasoning model. Alternatively, the statistical validation module 110 may employ simple substitution of part-worths of the deal attributes of the historical deals and compute the total utility for each of the historical deals. The statistical validation module 110 may then compare the predicted likelihood of approval to the actual outcome of the historical deal. The statistical validation module 110 may then evaluate the percentage accuracy of the expert reasoning model.

The statistical validation module 110 may also detect the temporal stability of preferences of the deal team members. For example, in a financial deal scenario, temporal stability of risk preferences can mean that decision makers exhibit the same risk attitudes over time, or that their risk attitudes are a stable function of states of nature and opportunities that change over time, such as competition and alternative investment opportunities.

In one embodiment, the statistical validation module 110 may use an apriori sign violation of the estimated part-worths as a measure of the temporal stability. An apriori sign violation is a mismatch between the ordinality of the true and estimated part-worths. An apriori sign violation occurs when the preference order of any of the pair wise part-worth utilities are contrary to expectations. For example, consider a deal attribute A with three levels A1, A2 and A3, with the expected order of part-worths being A1<A2<A3. If this condition is not satisfied for the estimated part-worths, an a priori sign violation has occurred. The statistical validation module 110 may compute a risk rating for each sign violation. The statistical validation module 110 may then take into account the risk rating for the critical deal attribute for which the sign violation has occurred, while re-tuning the expert reasoning model.

In some other embodiments, the statistical validation module 110 may use other known techniques for measuring the temporal stability of the preferences of the deal team members, based on the estimated part-worths of the critical deal attributes. Such methods include, for example, dynamic Bayesian linear methods, regression tree methods; validity correlation methods, Rasch models, association rule mining methods, and so forth.

In one embodiment, the EDM system 102 may re-tune the expert reasoning model based on the results of the statistical validation, to ensure a better fit of the expert reasoning model to the estimated part-worths of the critical deal attributes.

Figure 4:
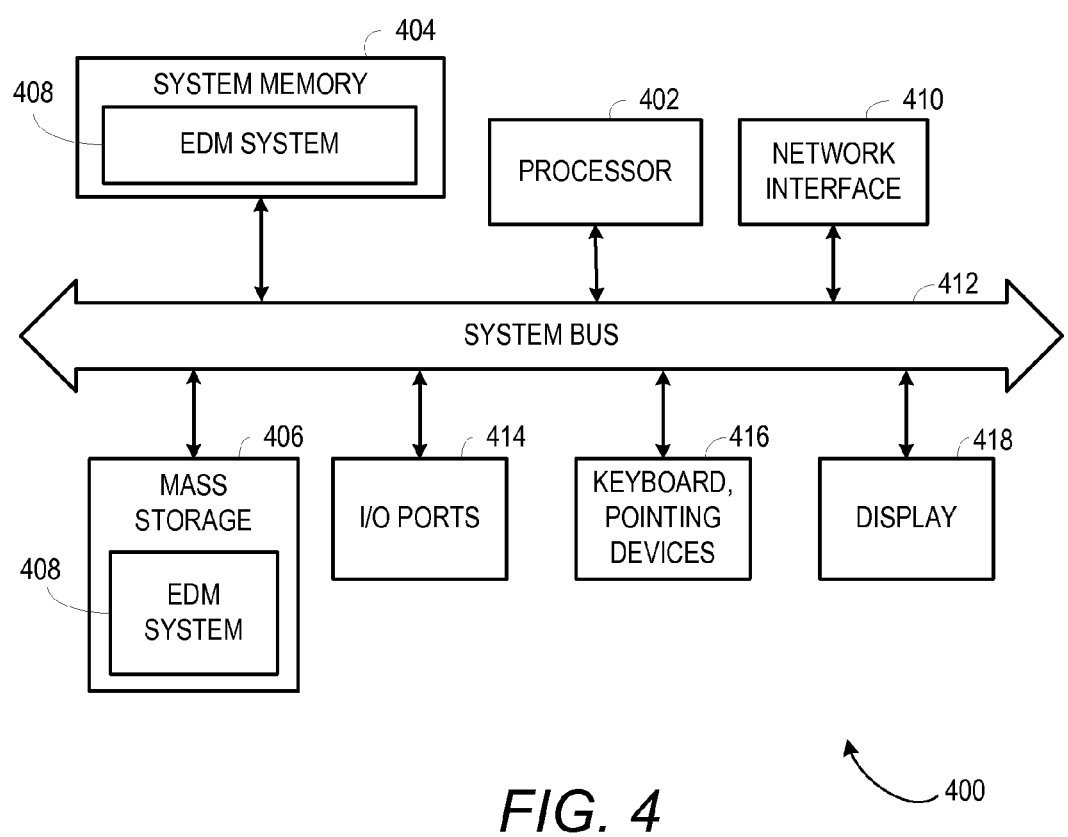
FIG. 4 illustrates an exemplary decision making model generator, according to one embodiment.

FIG. 4 illustrates an example hardware system 400 for implementing the EDM system 102 according to one embodiment. Hardware system 400 includes at least one processor 402, a system memory 404, and mass storage 406. The system memory 402 has stored therein one or more application software, programming instructions 408 for implementing the EDM system 102, an operating system and drivers directed to the functions described herein. Mass storage 406 provides permanent storage for the data and programming instructions 408 for the EDM system 102, whereas system memory 404 (e.g., DRAM) provides temporary storage for the data and programming instructions when executed by processor 402. The process flow of the programming instructions 408 for the EDM system 102 is described in detail in conjunction with FIG. 2, and FIG. 3. In on embodiment, deal data store 112 may reside in mass storage 406. A network/communication interface 410 provides communication between hardware system 400 and any of a wide range of networks, such as an Ethernet (e.g., IEEE 802.3) network, etc. Additionally, hardware system 400 includes a high performance system bus 412.

In one embodiment, the processes 200, and 300 described herein are implemented as a series of software routines run by hardware system 400. These software routines comprise a plurality or series of instructions to be executed by a processor in a hardware system, such as processor 402. Initially, the series of instructions are stored on a storage device, such as mass storage 406. However, the series of instructions can be stored on any suitable storage medium, such as a diskette, CD-ROM, ROM, EEPROM, DVD, Blu-ray disk, etc. Furthermore, the series of instructions need not be stored locally, and could be received from a remote storage device, such as server on a network, via network/communication interface 410. The instructions are copied from the storage device, such as mass storage 406, into system memory 404 and then accessed and executed by processor 402.

In one embodiment, hardware system 400 may also include I/O ports 414, a keyboard and pointing device 416, a display 418 coupled to bus 412. I/O ports 414 are one or more serial and/or parallel communication ports that provide communication between additional peripheral devices, which may be coupled to hardware system 400. Hardware system 400 may further include video memory (not shown) and a display device coupled to the video memory. Collectively, these elements are intended to represent a broad category of computer hardware systems, including but not limited to general purpose computer systems based on the x86 and x64 platform compatible processors manufactured by Intel Corporation of Santa Clara, Calif., and the x86-compatible processors manufactured by Advanced Micro Devices (AMD), Inc., of Sunnyvale, Calif., as well as any other suitable processor.

Alternatively, the hardware system 400 may be a mobile computing device such as, but not limited to, a Personal Digital Assistant (PDA), a smartphone, a tablet PC, and the like. Various components of the hardware system 400 may be optimized for use in such mobile computing devices. The software routines and the presentation of the conjoint questionnaire may also be optimized for the mobile computing device.

An operating system manages and controls the operation of hardware system 400, including the input and output of data to and from software applications (not shown). The operating system provides an interface between the software applications being executed on the system and the hardware components of the system. According to one embodiment of the present invention, the operating system is the LINUX operating system. However, the present invention may be used with other suitable operating systems, such as the Windows® Server operating system, available from Microsoft Corporation of Redmond, Wash., the Apple Macintosh Operating System, available from Apple Computer Int. of Cupertino, Calif., UNIX operating systems, and the like.

Embodiments presented herein have been explained with reference to specific embodiments. For example, while embodiments of the present invention have been described with reference to specific hardware and software components, those skilled in the art will appreciate that different combinations of hardware and/or software components may also be used, and that particular operations described as being implemented in hardware might also be implemented in software or vice versa. Other embodiments will be evident to those of ordinary skill in the art. It is therefore not intended that the present invention be limited, except as indicated by the appended claims.

The invention claimed is:

1. A method comprising:
receiving, at a server, a plurality of expert identified deal attributes;
presenting a conjoint analysis questionnaire for input by one or more respondents, wherein the conjoint analysis questionnaire includes questions based on the plurality of expert identified deal attributes;
receiving, at the server, responses of the one or more respondents to the conjoint analysis questionnaire;
defining an expert reasoning model based on the responses of the one or more respondents to the conjoint analysis questionnaire;
accessing historical deal information of one or more deals, the historical deal information including one or more deals, each deal including a plurality of expert identified deal attributes and a part-worth associated with each of the deal attributes; and
validating the expert reasoning model based on the historical deal information,
wherein said conjoint analysis questionnaire, comprises:
presenting one or more deal attribute rating questions to prompt the respondent to assign importance levels to the plurality of expert identified deal attributes;
selecting a predetermined number of critical deal attributes from the plurality of expert identified deal attributes, based on responses to the one or more deal attribute rating questions;
presenting one or more trade-off questions based on the selected critical deal attributes; and
presenting one or more calibration questions, to prompt the respondent to provide a scaling factor.

2. The method of claim 1 wherein defining the expert reasoning model further comprises:
for each respondent, computing part-worths for each of the critical deal attributes based on the responses to the conjoint analysis questionnaire;
for each respondent, computing a utility function based on the computed part-worths and the critical deal attributes; and
creating the expert reasoning model based on the utility functions of each respondent.

3. The method of claim 2 wherein defining the expert reasoning model further comprises:
for each respondent, determining a measure of temporal stability, based on the computed part-worth for each of the critical deal attributes, and an expected part-worth for each of the critical deal attributes; and
modifying the utility function based on the measure of temporal stability.

4. The method of claim 3 wherein the measure of temporal stability is determined using one or more of an apriori sign violation method, a dynamic Bayesian linear method, a regression tree method, a validity correlation method, Rasch modeling, and an association rule mining method.

5. The method of claim 1 wherein defining the expert reasoning model further comprises scaling the part-worths for each of the critical deal attributes based on the responses to the one or more calibration questions.

6. A system comprising:
at least one processor;
computer program code stored in a computer readable storage medium, wherein the computer program code, when executed, is operative to cause the at least one processor to:
receive a plurality of expert identified deal attributes;
present a conjoint analysis questionnaire for input by one or more respondents, wherein the conjoint analysis questionnaire includes questions based on the plurality of expert identified deal attributes;

receive responses of the one or more respondents to the conjoint analysis questionnaire;

define an expert reasoning model based on the responses of the one or more respondents to the conjoint analysis questionnaire;

access historical deal information of one or more deals, the historical deal information including one or more deals, each deal including a plurality of expert identified deal attributes and a part-worth associated with each of the deal attributes; and validate the expert reasoning model based on the historical deal information;

wherein the computer program code is further operative to cause the at least one processor to:

present one or more deal attribute rating questions to prompt the respondent to assign importance levels to the plurality of expert identified deal attributes;

select a predetermined number of critical deal attributes from the plurality of expert identified deal attributes, based on responses to the one or more deal attribute rating questions;

present one or more trade-off questions based on the selected critical deal attributes; and present one or more calibration questions, to prompt the respondent to provide a scaling factor.

7. The system of claim 6 the computer program code is further operative to cause the at least one processor to:

for each respondent, compute part-worths for each of the critical deal attributes based on the responses to the conjoint analysis questionnaire;

for each respondent, compute a utility function based on the computed part-worths and the critical deal attributes; and create the expert reasoning model based on the utility functions of each respondent.

8. The system of claim 7 the computer program code is further operative to cause the at least one processor to:

for each respondent, determine a measure of temporal stability, based on the computed part-worth for each of the critical deal attributes, and an expected part-worth for each of the critical deal attributes; and modify the utility function based on the measure of temporal stability.

9. The system of claim 8 wherein the measure of temporal stability is determined using one or more of an apriori sign violation method, a dynamic Bayesian linear method, a regression tree method, a validity correlation method, Rasch modeling, and an association rule mining method.

10. The system of claim 6 wherein defining the expert reasoning model further comprises scaling the part-worths for each of the critical deal attributes based on the responses to the one or more calibration questions.

11. A computer program product comprising a non-transitory computer readable medium encoded with computer-executable instructions, wherein the computer-executable instructions, when executed, cause one or more processors to:

receive a plurality of expert identified deal attributes;

present a conjoint analysis questionnaire for input by one or more respondents, wherein the conjoint analysis questionnaire includes questions based on the plurality of expert identified deal attributes;

receive responses of the one or more respondents to the conjoint analysis questionnaire;

define an expert reasoning model based on the responses of the one or more respondents to the conjoint analysis questionnaire;

access historical deal information of one or more deals, the historical deal information including one or more deals, each deal including a plurality of expert identified deal attributes and a part-worth associated with each of the deal attributes; and validate the expert reasoning model based on the historical deal information;

wherein the computer executable instructions cause the one or more processors to:

present one or more deal attribute rating questions to prompt the respondent to assign importance levels to the plurality of expert identified deal attributes;

select a predetermined number of critical deal attributes from the plurality of expert identified deal attributes, based on responses to the one or more deal attribute rating questions;

present one or more trade-off questions based on the selected critical deal attributes; and present one or more calibration questions, to prompt the respondent to provide a scaling factor.

12. The computer program product of claim 11 further comprising computer executable instructions to cause the one or more processors to:

compute part-worths for each of the critical deal attributes based on the responses to the conjoint analysis questionnaire, for each respondent;

compute a utility function based on the computed part-worths and the critical deal attributes, for each respondent; and create the expert reasoning model based on the utility functions of each respondent.

13. The computer program product of claim 12 further comprising computer executable instructions to cause the one or more processors to:

determine a measure of temporal stability for each respondent based on the computed part-worth for each of the critical deal attributes, and an expected part-worth for each of the critical deal attributes; and modify the utility function based on the measure of temporal stability.

14. The computer program product of claim 13 wherein the measure of temporal stability is determined using one or more of an apriori sign violation method, a dynamic Bayesian linear method, a regression tree method, a validity correlation method, Rasch modeling, and an association rule mining method.

15. The computer program product of claim 12 further comprising computer executable instructions to cause the one or more processors to scale the part-worths for each of the critical deal attributes based on the responses to the one or more calibration questions.

* * * * *